Feb. 1, 1938.　　　　J. A. VOLK　　　　2,106,778
PHONOGRAPH
Filed Dec. 10, 1931
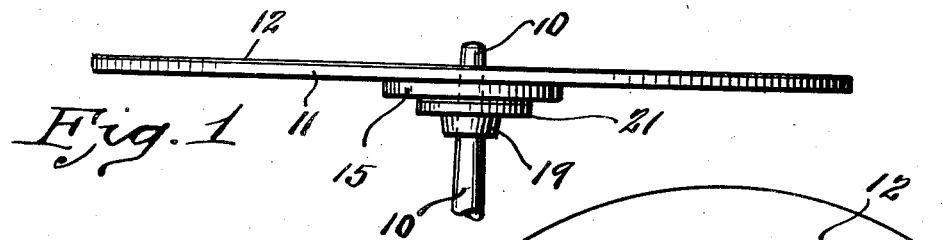
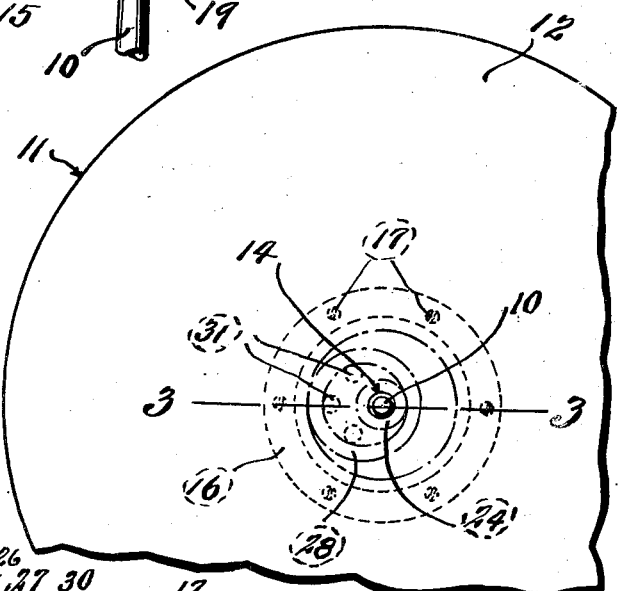
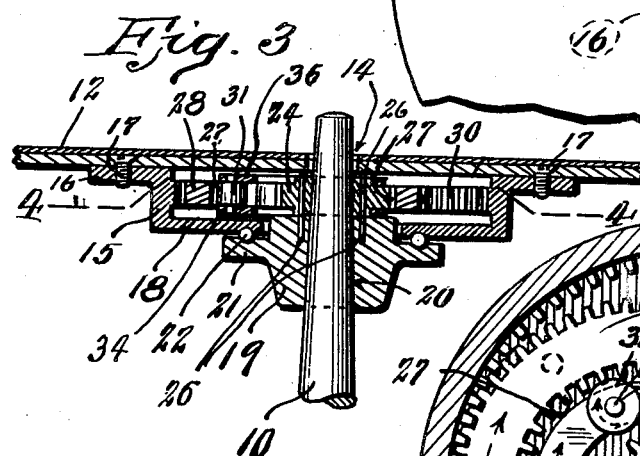
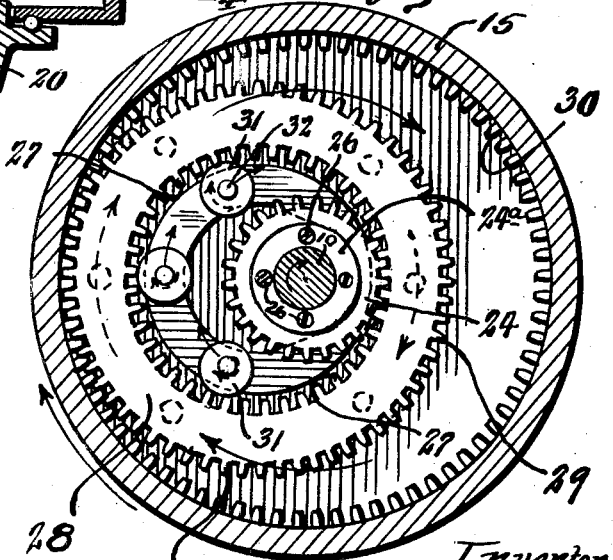
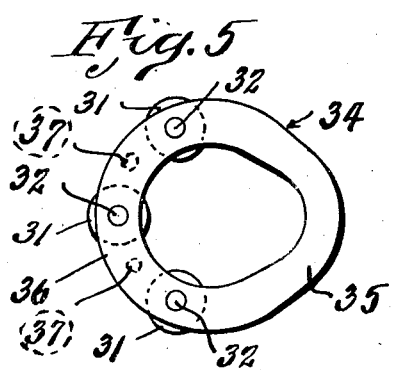
Inventor
Joseph A. Volk
By William James
Atty.

Patented Feb. 1, 1938

2,106,778

UNITED STATES PATENT OFFICE 2,106,778

PHONOGRAPH

Joseph A. Volk, St. Louis, Mo., assignor, by mesne assignments, to Radio Corporation of America, New York, N. Y., a corporation of Delaware Application December 10, 1931, Serial No. 580,040

5 Claims. (Cl. 274—9)

This invention relates generally to phonographs, and more particularly to the turn-table or record supporting and actuating member thereof. Heretofore phonograph-records have been made to operate or rotate at a speed of about seventy-eight revolutions per minute and the driving mechanism of the phonograph has been arranged to impart this speed to the turn-table. The new improved phonograph-records are made to be actuated at a speed of about thirty-three revolutions per minute, and consequently such records cannot be used in the old phonographs unless a new driving mechanism is substituted or reduction gearing interposed between the motor and the turn-table. Such changes are expensive as they require the services of an experienced mechanic and the manufacture and installation of special reduction gearing.

It is the primary object of my invention to provide an improved turn-table which can be placed in position on the ordinary phonograph in place of the old turn-table and which can be operated at thirty-eight revolutions from the spindle of the machine which operates at seventy-eight revolutions.

Other objects of the invention are to provide a turn-table for phonographs which can be supported by the revoluble spindle of the machine and operated thereby at differential speed with respect thereto, whereby the new records can be used in conjunction with the old phonographs.

Still other objects of the invention are to provide a turn-table for phonographs, which turn-table has operatively associated therewith mechanism engageable with a spindle of the phonograph whereby the revoluble motion from said spindle is transmitted to said turn-table at reduced speed.

Further objects of the invention are to provide a turn-table for phonographs wherein said turn-table has fixed thereto a support in which is revolubly and concentrically mounted a socket for engaging a spindle of the phonograph driving mechanism, there being suitable driving connections interposed between said socket and said turn-table whereby the latter derives its motion from said spindle at a differential speed with respect thereto.

Additional objects of the invention are to provide an improved turn-table detachably and operatively supported by the spindle of a phonograph, said turn-table being adapted to be driven by said spindle at reduced speed.

With these and other objects in view, my invention consists in certain novel features of construction and arrangement of parts hereinafter more fully described and claimed, and illustrated in the accompanying drawing, in which—

Figure 1 is a side elevational view of my improved turn-table showing the phonograph spindle broken away.

Figure 2 is a top plan view of my improved turn-table partly broken away.

Figure 3 is an enlarged vertical cross section taken on line 3—3 of Figure 2.

Figure 4 is a horizontal cross section taken on line 4—4 of Figure 3.

Figure 5 is a top plan view of the roller carrying rings.

Referring by numerals to the accompanying drawing, 10 indicates a spindle of a phonograph and 11 a turn-table for supporting the phonograph records. The spindle is of usual construction, being tapered upwardly and being actuated by the phonograph driving mechanism in the usual manner. The turn-table 11 is of usual size and has its upper face provided with a suitable layer of fabric 12 upon which the records are placed in the usual manner. The turn-table is not supported directly by the spindle and is provided with a central opening 14 which is slightly larger than the upper end of the spindle so as to provide clearance therebetween.

The underside of the turn-table is provided with a support or ring 15 having its upper end formed with an outwardly and horizontally projecting flange 16 to which is secured the turn-table in any suitable manner, such as by screws 17. The lower end of said ring 15 is provided with a horizontally and inwardly disposed flange 18. A hub 19 has an upwardly tapering bore 20 in which is disposed the spindle 10. The upper end of hub 19 extends through the central opening formed by flange 18 and terminates preferably a slight distance above the upper face thereof. The lower end of said hub extends downwardly a suitable distance so as to form the bore 20 of sufficient length to insure proper operative contact between said hub or socket member 19 and said spindle 10.

A flange 21 is formed integral with hub 19 below flange 18 and in spaced relation therewith. A ball bearing 22 is received between said flanges 18 and 21 and supports freely ring member 15 and turn-table 11 on said hub 19 so that said turn-table can rotate independently of said spindle. A pinion 24 is arranged concentrically with and above said hub 19 and is provided with a bore 25 which is disposed coaxially with the bore 20 of said hub 19 and receives the spindle 11. Pinion 24 and hub 19 are secured together by screws 26.

Meshing with said pinion 24 are the internally disposed teeth 27 of a ring gear 28. This ring gear is disposed eccentrically to said pinion 24 and is provided with external gear teeth 29 which mesh with internally disposed gear teeth 30 formed integral with or fixed to ring 15. Ring gear 28 is supported on flange 18 in any suitable manner and rotates around the axis of spindle 10. This ring gear 28 is held in its proper operative position in any suitable manner, preferably by a plurality of rollers 31 which are revolubly mounted by means of trunnions 32 in a pair of carrying rings 34. These rings are eccentrically disposed and are arranged to each side of pinion 24. The inner or reduced ends 35 of said rings loosely engage the reduced ends 24a of pinion 24. The outer ends 36 of rings 34 are arranged adjacent to the internal gear teeth of ring 29 and receive trunnions 32 of said rollers. These rollers engage the inner face or gear teeth of said ring at a plurality of spaced points and maintain said ring in mesh with pinion 24 and with ring 15 and at the same time permit rotating movement of said ring gear around its own axis. The outer end of the lower ring 34 is preferably supported on flange 18 in any suitable manner, such as projections 37.

The gear mechanism just described forms reduction drive between the spindle actuated pinion 24 and turn-table 11 whereby the latter is actuated by said spindle at reduced speed and in the same direction as said spindle. Thus said turn-table can be used to support and operate new phonograph-records requiring low speeds on phonographs, the driving mechanism of which operates at old or high speed. As the entire transmission mechanism is supported on the underside of the turn-table the old phonographs can be readily converted or adapted to play new phonograph-disks or records merely by replacing the old turn-table with my improved one.

I claim:

1. In a phonograph turn-table construction, the combination of a hub adapted to be placed upon and have non-rotative engagement with a spindle of a phonograph, a support revolubly mounted on said hub, a turn-table carried by said support, and means arranged in said support for operative association of said hub with said turn-table whereby the latter is operated by said phonograph spindle at differential speed with respect thereto.

2. In a device of the class described, the combination of a turn-table, a support fixed to the underside thereof, a hub revolubly mounted in said support concentrically with said turn-table, said hub being provided with a bore for receiving a spindle of a phonograph drive mechanism whereby said turn-table is supported on said spindle and is revoluble independently thereof, and means within said support operatively connecting said hub and said turn-table for actuating the latter from said spindle at a different speed with respect thereto.

3. In a device of the class described, the combination of a turn-table, a support fixed to the underside thereof, a hub member revolubly mounted in said support concentrically with said turn-table, said hub member being provided with a bore for receiving a spindle of a phonograph driving mechanism whereby said turn-table is supported on said spindle and is revoluble independently thereof, a pinion conjoined with said hub member, an internal gear fixed to said support, and a ring gear provided with internal and external gears, one of which meshes with said pinion and the other with the first-mentioned internal gear whereby motion is transmitted from said spindle to said turn-table.

4. In a device of the class described, the combination of a hub member adapted to be supported on and have operative engagement with a spindle of a phonograph driving mechanism, a support revolubly carried by said hub, a turn-table fixed to said support concentrically with said hub member, and reduction gearing interposed between said hub member and said support and enclosed within said support for actuating the latter and said turn-table by said spindle at reduced speed with respect thereto and in the same direction as said spindle.

5. In a phonograph, the combination with the driving mechanism thereof, including a vertically disposed revoluble spindle, of a hub member detachably supported by and in operative engagement with said spindle, a horizontally disposed turn-table, means for revolubly supporting said turn-table on said hub member, and mechanism operatively associated with said turn-table and with said hub member for imparting revoluble motion from said spindle to said turn-table at reduced speed relatively to and in the same direction as said spindle, said mechanism being enclosed entirely within said supporting means.

JOSEPH A. VOLK.